(12) United States Patent
Cai

(10) Patent No.: US 8,057,871 B2
(45) Date of Patent: Nov. 15, 2011

(54) ANTI-THEFT LABEL AND ITS ASSEMBLY METHOD

(76) Inventor: Fengyi Cai, Fujian Province (CN)

( * ) Notice: Subject to any disclaimer, the term of this patent is extended or adjusted under 35 U.S.C. 154(b) by 384 days.

(21) Appl. No.: 12/279,538

(22) PCT Filed: May 29, 2006

(86) PCT No.: PCT/CN2006/001150
§ 371 (c)(1),
(2), (4) Date: Aug. 14, 2008

(87) PCT Pub. No.: WO2007/137454
PCT Pub. Date: Dec. 6, 2007

(65) Prior Publication Data
US 2009/0098320 A1   Apr. 16, 2009

(51) Int. Cl.
*B29D 22/00* (2006.01)
*B29D 23/00* (2006.01)
*B32B 1/08* (2006.01)
*B32B 27/10* (2006.01)

(52) U.S. Cl. .................. 428/34.3; 428/40.1; 428/34.1; 428/34.2; 428/611; 428/928; 283/81; 340/551; 340/572.1; 156/306.6; 156/DIG. 2

(58) Field of Classification Search ............... 428/40.1, 428/34.1, 34.2, 34.3, 611, 928; 283/81; 340/551; 340/572.1; 156/306.6, DIG. 2
See application file for complete search history.

*Primary Examiner* — Michael C Miggins

(57) ABSTRACT

This invention provides an improved anti-theft label and its assembly method. It uses paper box and paper sealing gasket to replace PVC box and PET sealing gasket. The anti-theft label applying the technical scheme of this invention is non-toxic and does no harm to human health. It can be used safely, and is the new generation of anti-theft label that is good for environment protection and represents the main developing trend of future anti-theft labels. Moreover, in the improved anti-theft label in this invention, we use double-sided gummed paper that can easily get from market to replace self-adhesive glues which needs to be sprayed. The assembling techniques are simpler; consequently the production efficiency can be significantly improved.

10 Claims, 4 Drawing Sheets

ANTI-THEFT LABEL AND ITS ASSEMBLY METHOD

BACKGROUND OF THE INVENTION

This invention refers to an anti-theft label and its assembly method.

Presently, in libraries, bookstores or supermarkets, magnetic anti-theft labels are commonly used on books or other commodities in order to prevent them from being stolen. Generally speaking, anti-theft labels are fixed on books or other commodities by means of "sticking".

The existing anti-theft labels, whose configuration as shown on PIC-1 and PIC-2, are composed by PVC vented box 1', where polarizer 2' and polarizer 3' are placed inside. The opening part of the PVC vented box 1' is covered with PET sealing gasket 4'. PET sealing gasket 5' is pressed on the upper part of PET sealing gasket 4', while magnetic bias 6' is set between sealing gasket 4' and sealing gasket 5', whose position corresponds with that of polarizer 2' and polarizer 3'. The surface of sealing gasket 5' is coated with self-adhesive gules 7', and on the self-adhesive gules release paper 8' is overcastted. While assembling, firstly, place polarizer 2' and polarizer 3' inside the PVC vented box 1', press magnetic bias 6' in between PET sealing gasket 4' and sealing gasket 5', then bring PET sealing gasket 4' and sealing gasket 5' together by Heat Press and fix magnetic bias 6', enabling it correspond to polarizer 2' and polarizer 3'. Afterwards, place PET sealing gasket 4' at the opening part of PVC vented box 1' by Heat Press, then spray self-adhesive glues 7' on the surface of PET sealing gasket 5', and finish assembling by covering release paper 8' on self-adhesive glues 7'. This type of anti-theft label and its assembly method has the following disadvantages: ① the vented box uses PVC materials, which is one of plastic products that cause severe pollution to environment and damage to human health. Moreover, PVC is non-recyclable material, once burnt, will produce dioxin and furan, which have very strong toxicity and Carcinogenicity. Nowadays PVC as a raw material is prohibited in many fields. ② the techniques of spraying self-adhesive glues on PET sealing gaskets are very complicated, resulting in low efficiency.

BRIEF SUMMARY OF THE INVENTION

The aim of this invention is to provide a green simply improved anti-theft label and its assembly method.

The technical scheme of this invention goes as follow, improved anti-theft label, including polarizer and magnetic bias. Above-mentioned polarizer is placed inside a paper box, whose opening part is covered with paper sealing gasket. The lower side of above-mentioned magnetic bias is adhered to the upper side of above-mentioned paper sealing gasket, corresponding to the position of above-mentioned polarizer. The upper side of above-mentioned paper sealing gasket is covered with double-sided gummed paper.

Above-mentioned paper box is made from paper pulp.

Above-mentioned paper box is made of cardboards.

Above-mentioned sealing gasket is made of laminated paper.

The assembly method of improved anti-theft label can be realized with the following steps:

Step1: preparing paper box;
Step2: place polarizer into above-mentioned paper box;
Step3: stick paper sealing gasket at the opening part of above-mentioned paper box;
Step4: stick magnetic bias to the upper side of above-mentioned paper sealing gasket, corresponding to the position of above-mentioned polarizer.
Step5: cast double-sided gummed paper on the upper side of above-mentioned paper sealing gasket, so as to fix the magnetic bias in between above-mentioned paper sealing gasket and double-sided gummed paper. And an improved anti-theft label is done.

The paper box used in step1 is paper-pulp box made by paper pulp processing techniques that are commonly used.

The paper box used in step1 is cardboard box composed by cardboards with through holes and bottom sealing cardboard stuck to the lower side of the through holes.

The paper sealing gasket used in step3 is laminated paper.

The thickness of above-mentioned cardboards is 0.5 mm-1.5 mm.

The thickness of above-mentioned bottom sealing cardboard is about 0.2 mm-0.4 mm.

With the adoption of above-mention technical scheme, PVC vented box and PET sealing gasket are replaced by paper vented box and paper sealing gasket. The improved anti-theft label in this invention is nontoxic and does no harm to human health. Being able to be used safely, it is the new generation of anti-theft label which is good for environment protection. Nevertheless, it is easier to print designs on paper box, which is the main developing trend of future anti-theft labels. Moreover, in the improved anti-theft label in this invention, we use double-sided gummed paper that can easily get from market to replace self-adhesive glues which needs to be sprayed. The assembling techniques are simpler; consequently the production efficiency can be significantly improved.

DETAILED DESCRIPTION OF THE INVENTION

Figure 1:
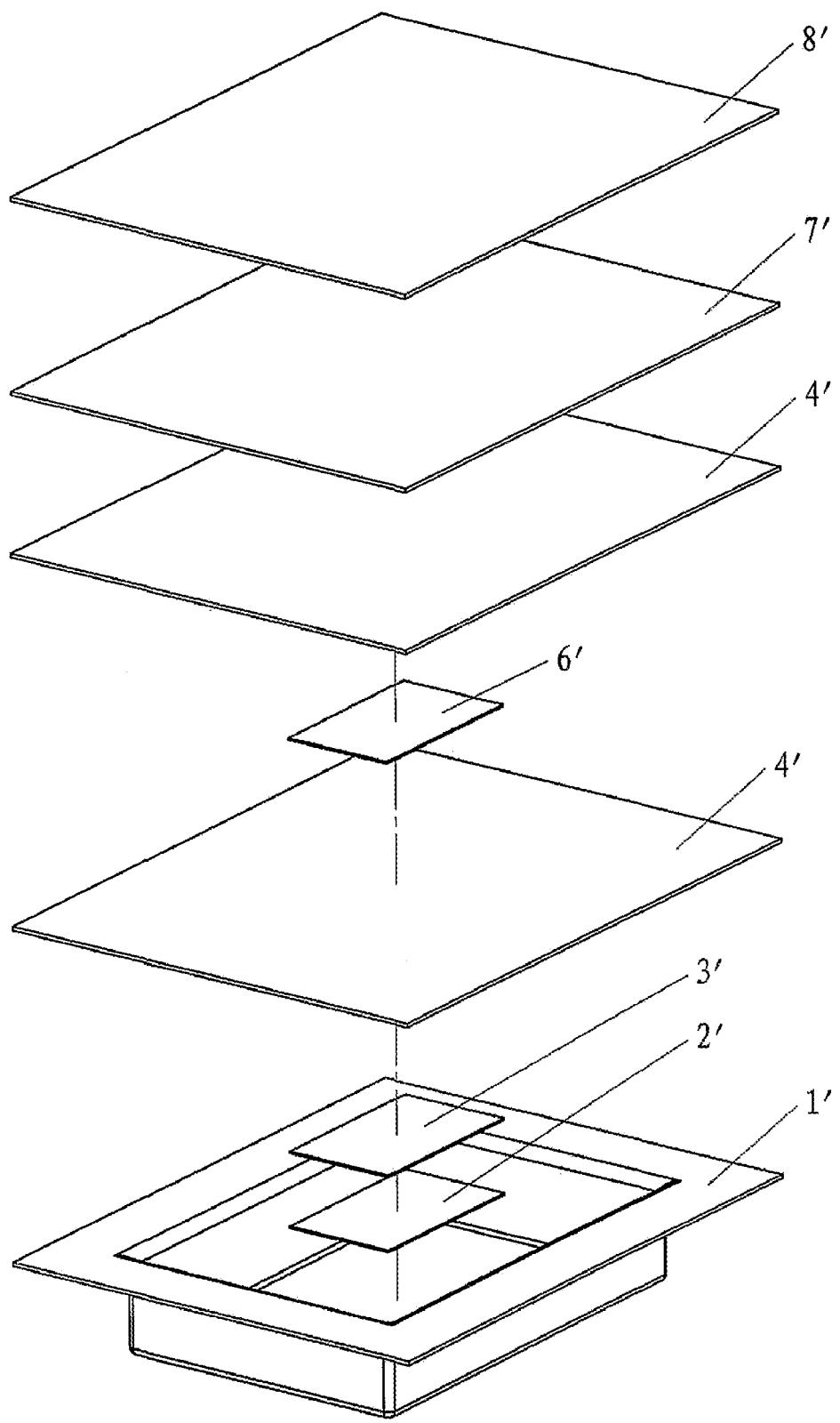
FIG. 1 is a configuration chart of commonly-used anti-theft label.
Figure 2:
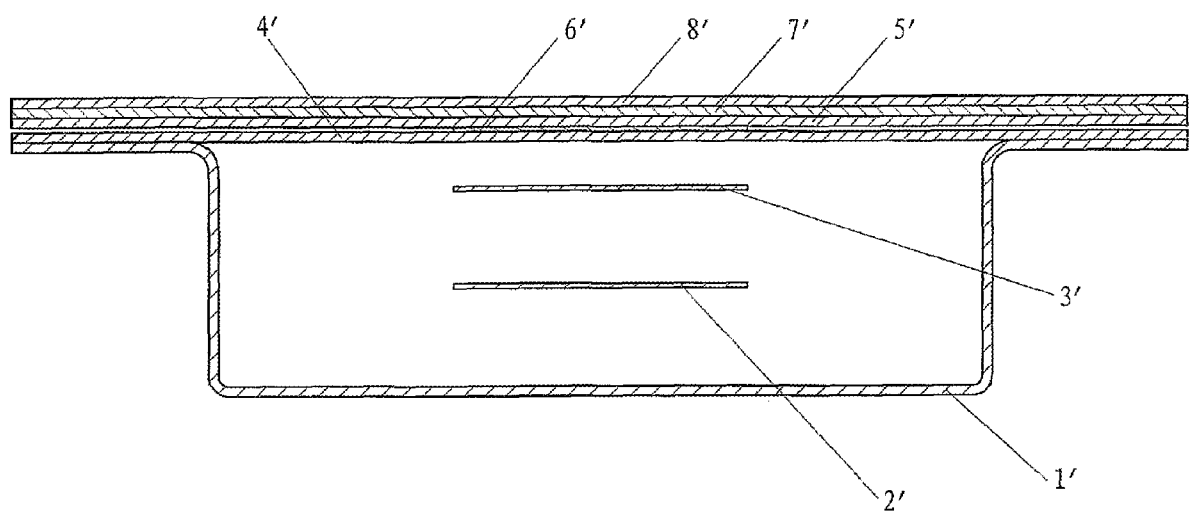
FIG. 2 is a sectional view of commonly-used anti-theft label.
Figure 3:
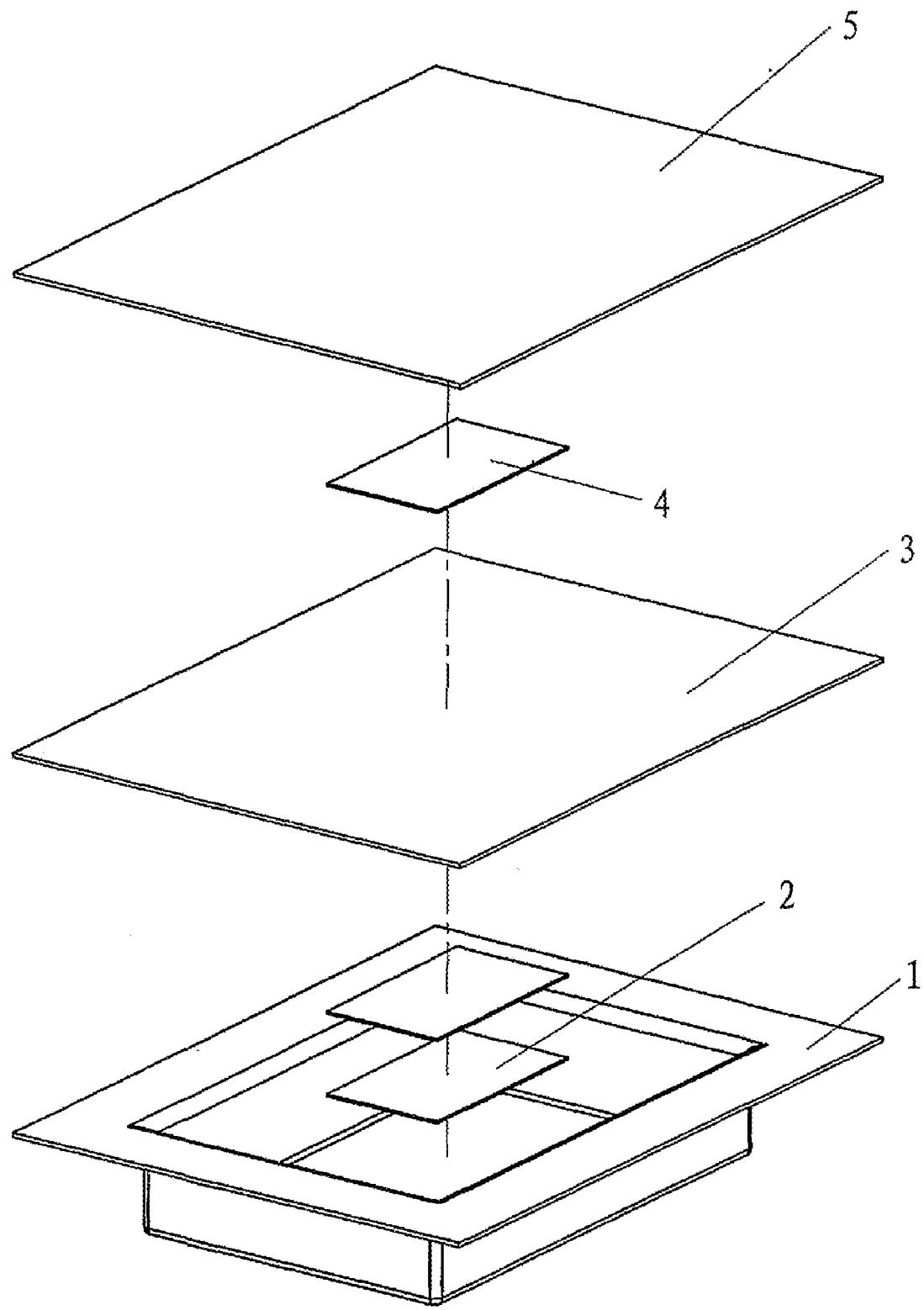
FIG. 3 is a configuration chart of New Practical Improved Anti-theft Label.
Figure 4:
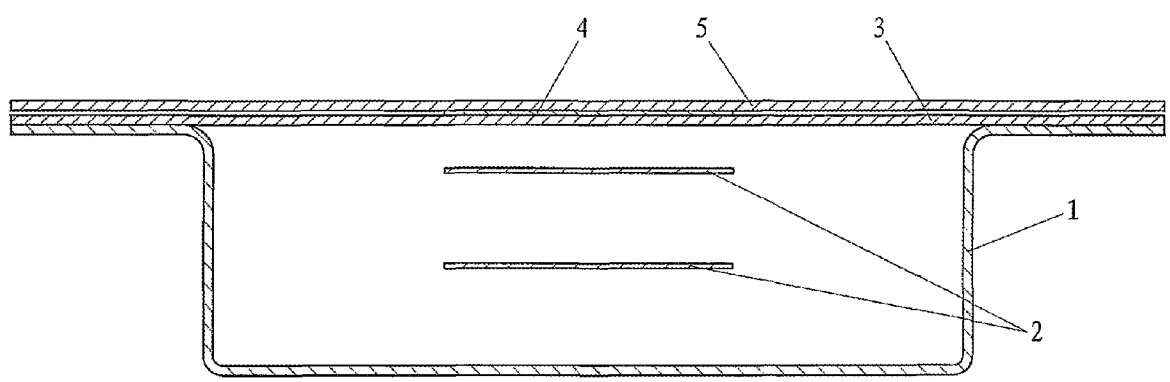
FIG. 4 is a sectional view of New Practical Improved Anti-theft Label.

The improved anti-theft label in this invention, as shown on PIC-3 and PIC-4, includes paper pulp box 1, two pieces of polarizer 2, laminated paper 3, magnetic bias 4 and double-sided gummed paper 5. Two polarizer 2 are placed inside paper pulp box 1, laminated paper 3 is stuck to the opening part of paper pulp box and seal it, the lower side of magnetic bias 4 is fixed to the upper side of laminated paper 3 and corresponds to the position of polarizer 2, double-sided gummed paper is covered on the upper side of laminated paper 3, pressing magnetic bias 4 in between laminated paper 3 and double-sided gummed paper 5.

In this invention, laminated paper 3 can be replaced by ordinary paper. Seal the opening part of paper pulp box 1 with ordinary paper by using gumwater or other binding agents.

In this invention, the paper box 1 is made by commonly-used paper pulp processing techniques. Paper pulp box 1 can be replaced by cardboard box, which can be made by 1 mm cardboards with through holes and 0.3 mm bottom sealing cardboard stuck to the lower side of the through holes of the 1 mm cardboards. The assembling method of improved anti-theft label can be realized with the following steps:

Step1: preparing paper box; it can be paper-pulp box made by commonly-used paper pulp processing techniques or cardboard box made by 1 mm cardboards with through holes and 0.3 mm bottom sealing cardboard stuck to the lower side of the through holes of the 1 mm cardboards.

Step2: place polarizer into paper pulp box/cardboard box;

Step3: stick laminated paper at the opening part of paper pulp box/cardboard box; laminated paper can be replaced by ordinary paper. Seal the opening part of paper pulp box/cardboard box with ordinary paper by using gumwater or other binding agents.

Step4: spread gumwater or other binding agents on the upper side of laminated paper at the position corresponding to that of polarizer, then place magnetic bias on the binding agent to fix it.

Step5: cast double-sided gummed paper on the upper side of laminated paper, so as to fix the magnetic bias in between laminated paper and double-sided gummed paper. Thus an improved anti-theft label in this invention is done.

I claim:

1. An improved anti-theft label, including polarizer and magnetic bias, wherein said polarizer is placed inside the paper box; the opening part of paper box is covered with paper sealing gasket; the lower side of said magnetic bias is adhered to the upper side of said paper sealing gasket, corresponding to the position of that of said magnetic bias; the upper side of said paper sealing gasket is covered with double-sided gummed paper.

2. The improved anti-theft label as described in claim 1, wherein the said paper box is made from paper pulp.

3. The improved anti-theft label as described in claim 1, wherein the said paper box is made of cardboards.

4. The improved anti-theft label as described in claim 1, wherein the said paper sealing gasket is laminated paper.

5. An assembly method of improved anti-theft label comprising the following steps:
   Step 1: preparing paper box;
   Step 2: place polarizer into paper box;
   Step 3: stick paper sealing gasket at the opening part of paper box;
   Step 4: stick magnetic bias to the upper side of said paper sealing gasket, corresponding to the position of said polarizer;
   Step 5: cast double-sided gummed paper on the upper side of said paper sealing gasket, so as to fix the magnetic bias in between the said paper sealing gasket and said double-sided gummed paper; thus an improved anti-theft label in this invention is done.

6. The assembly method of improved anti-theft label as described in claim 5, wherein the paper box used in step1 is paper pulp box.

7. The assembly method of improved anti-theft label as described in claim 5, wherein the paper sealing gasket used in step3 is laminated paper.

8. The assembly method of improved anti-theft label as described in claim 5, wherein the paper box used in step1 is made by cardboards with through holes and bottom sealing cardboard stuck to the lower side of through holes on the said cardboard.

9. The assembly method of improved anti-theft label as described in claim 8, wherein the thickness of said bottom sealing cardboard is about 0.2 mm-0.4 mm.

10. The assembly method of improved anti-theft label as described in claim 8, wherein the thickness of said cardboards is around 0.5 mm-1.5 mm.

* * * * *